(No Model.)
F. M. ABBOTT.
DRYING REEL FOR FISHING LINES.
No. 459,669. Patented Sept. 15, 1891.
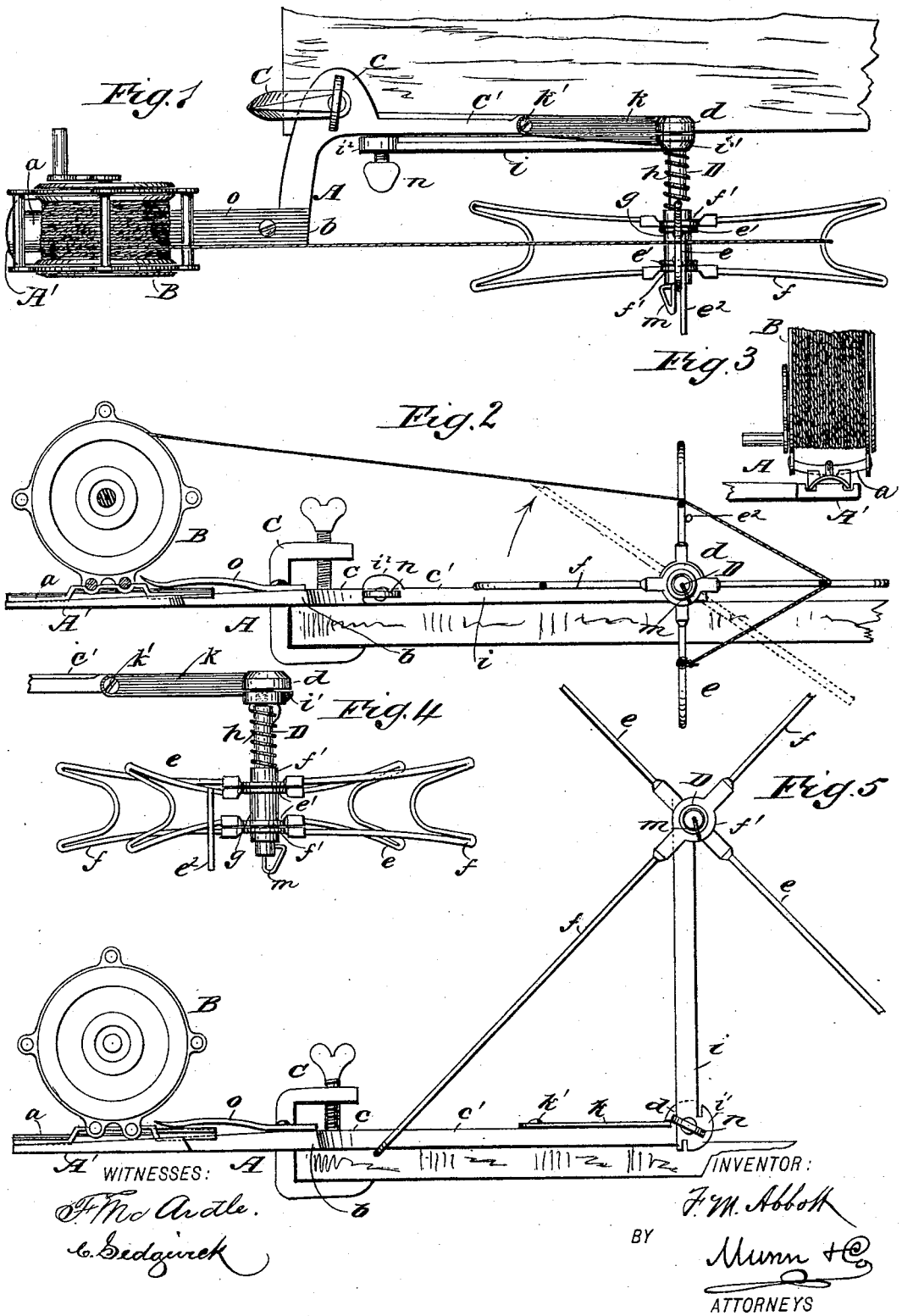
WITNESSES:
F. McArdle.
C. Sedgwick.
INVENTOR:
F. M. Abbott
BY Munn & Co.
ATTORNEYS
THE NORRIS PETERS CO., PHOTO-LITHO., WASHINGTON, D. C.

UNITED STATES PATENT OFFICE.

FLETCHER M. ABBOTT, OF WELLESLEY, MASSACHUSETTS.

DRYING-REEL FOR FISHING-LINES.

SPECIFICATION forming part of Letters Patent No. 459,669, dated September 15, 1891.

Application filed November 30, 1889. Serial No. 332,070. (No model.)

*To all whom it may concern:*

Be it known that I, FLETCHER M. ABBOTT, of Wellesley, in the county of Norfolk and State of Massachusetts, have invented a new and Improved Line-Drying Device, of which the following is a full, clear, and exact description.

My invention relates to an improved means for holding fishing-lines to dry them; and it consists in the novel construction and combination of parts, as hereinafter described, and indicated in the claims.

Ordinarily a fishing-line is wrapped upon its reel after use in a wet condition and there allowed to dry, which it does slowly, owing to the compact mass into which it is formed upon its supporting-reel. Lines, if improperly dried, are liable to become mildewed and rotten, rendering them worthless.

One object of my invention is to provide a simple, compact, and inexpensive device which may be securely clamped upon a suitable support and afford means for the retention in good form and free for ventilation of a wet fishing-line, so as to dry it quickly.

A further object is to furnish a convenient line-supporting reel whereon a dried line may be wrapped or a new line placed, and therefrom be reeled upon the fishing-reel proper.

A further object is to provide means for the ready attachment of a regular fishing-reel temporarily upon the frame of a line-drying reel when a dried line is to be re-wound from the drying-reel upon the fishing-reel.

Reference is to be had to the accompanying drawings, forming a part of this specification, in which similar letters of reference indicate corresponding parts in all the figures.

Figure 1 is a top plan view of the device and an attached regular fishing-reel, all clamped on a support. Fig. 2 is a side elevation of the drying-reel and regular line-holding reel, with the drying-reel in section. Fig. 3 is a front elevation of a portion of an ordinary fishing-reel and supporting-frame. Fig. 4 is a top plan view of the drying-reel in folded adjustment on a portion of the frame which supports it; and Fig. 5 is an enlarged side elevation of the line holding and drying reels on the frame, the drying-reel being partly broken away.

A represents the frame, which affords support to a drying-reel and also to a fishing-reel of the usual construction, when a fishing-line is to be transferred from one reel to the other. The portion A' of the frame A is flattened and grooved on its upper surface, as shown in Fig. 3, to adapt it to receive and properly support the foot-piece $a$ of a regular fishing-reel B.

At $b$ the frame-piece A' is laterally extended, as shown in Fig. 1, and at $c$ the frame is forwardly produced as a limb $c'$ from the bearing-pad that is formed at $c$, said pad being provided for the support of the entire device upon any suitable projection on which it can be clamped, a yoke-clamp C being provided for this purpose. The limb $c'$ is enlarged and rounded at its terminal end $d$, forming a boss that is flattened sidewise and centrally perforated therethrough for the reception of a threaded end of a shaft D, the perforation in the boss $d$ being tapped to afford a mating screw-thread for the shaft end.

A line-drying reel composed of two sections $e\,f$ is mounted on the shaft D. The reel-sections $e\,f$ are skeleton frames of different lengths, and are independent in their manner of support. Both are preferably constructed of wire rod bent into forms that adapt them to receive and sustain a fishing-line on their outer end portions. The section $e$ is shorter than the section $f$ and near its center of length is furnished with integral flat mating collars $e'$, that are secured to the limbs of the skeleton frame, and also to the sleeve $g$, upon which they are mounted. The longer frame-section $f$ of the drying-reel is constructed of wire bent into form, as shown in Fig. 4, and with the exception of its superior length is a duplicate of the shorter reel-section $e$. Collars $f'$ are affixed to the wire-rod limbs of the reel-section $f$ near their longitudinal centers, which collars loosely engage the sleeve $g$ outside of and in loose contact with the collars $e'$.

The construction of the drying-wheel as described permits the sections $e\,f$ to be adjusted at right angles to each other, as shown in Figs. 2 and 5, or folded partially, as shown in dotted lines in Fig. 2, or closely together, as represented in Fig. 4. The sleeve $g$ is of such relative diameter as to fit neatly on the shaft D, free to revolve, and in length is so proportioned thereto that a spiral spring $h$ may be placed on the shaft and bear against the end of the sleeve, as will be further explained.

In Fig. 1 an extension-bar $i$ is shown that is located parallel to and near the limb $c'$ of the frame A. It is retained in place by the shaft D, that is inserted through its enlarged and laterally-perforated boss $i'$, the spiral spring $h$ bearing against said boss. The other end of bar $i$ is provided with a second boss $i^2$, having a threaded perforation.

Another means for support to the extension-bar $i$ when in the position shown in Fig. 1 consists in the latching engagement therewith of the latch-plate $k$, which is pivoted by one end $k'$ to the limb $c'$, the forward end of said plate $k$ being introduced into radial slots cut in the rounded enlargements or bosses $d\ i'$, formed on the limb $c'$ and the extension-bar $i$. The position given the extension-bar $i$, as explained and shown in Fig. 1, is for its compact stowage when not in service, its legitimate use being to extend the limb $c'$ and adapt it to support a larger drying-reel, as shown in Fig. 5. The outer end of the sleeve $g$ is engaged by a keeper-loop $m$, which projects from the end of the shaft D. When the parts of the drying-reel are assembled upon the shaft D and the spring $h$ properly compressed, it will by its expansion restrain the shaft D and reel-sections $e\ f$ from too free rotation, adjustment of the shaft D endwise in the support at $d$ increasing or diminishing the frictional contact of the parts, as may be required.

When a large drying-reel is to be used to hold a long line, the extension-bar $i$ is adjusted as shown in Fig. 5, the longer portions representing the dimensions of the drying-reel sections $e\ f$. When the extension-bar $i$ is in service, as shown in Fig. 5, the shaft D is removed from the boss $d$ and a thumb-screw $n$ inserted in its place and the shaft D screwed into the boss $i^2$. The bar $i$ may be extended in alignment with the limb $c'$ or located at right angles therewith, as shown. When not in use, the screw $n$ is inserted in the boss $i^2$.

A leaf-spring $o$ is secured by one end to the portion $A'$ of the frame A, its free end being extended toward the end of said portion $A'$ and curved slightly upward, so that the foot-piece $a$ of a regular fishing-reel may be pushed endwise beneath the spring, and thus be removably held in contact with the frame A in alignment with the drying-reel, for transfer of a wet line from the fishing-reel to the drying-reel and a dry line from the latter-named to the fishing-reel.

In use when a line is to be wrapped upon the drying-reel its sections $e\ f$ are adjusted at right angles to each other, as shown in Fig. 2 in full lines, and one end of the line is secured to a portion of the shorter section $e$. The reel is now revolved away from the fishing-reel B by the projecting handle $e^2$, which will transfer a wet line from the latter-named reel to the drying-reel.

In order to loosen the layers of the line after it is wound upon the drying-reel, the longer section $f$ is moved toward the shorter section $e$, as shown by dotted lines in Fig. 2. This will slacken the tension of the coils and let them hang loose. If the device is placed in the open air or near heat, the line will be speedily dried, and by giving the section $f$ its normal position said line can be rewound on the fishing-reel B.

Having thus described my invention, I claim as new and desire to secure by Letters Patent—

1. A line-drying reel comprised of two radially-folding sections of different lengths revolubly supported near their longitudinal centers, substantially as set forth.

2. The combination, with an elongated frame-bar, a means to hold a fishing-reel thereon, and a device to secure the frame-bar to a stable object, of a skeleton line-drying reel having two sections of different lengths which are adapted to be spread at right angles or folded toward each other, substantially as set forth.

3. The combination, with an elongated frame-bar and a leaf-spring on the frame-bar which is adapted to hold a fishing-reel in alignment with the drying-reel, of a skeleton line-drying reel comprised of two folding sections of different lengths, and an extension-bar whereon the drying-reel is mounted, substantially as set forth.

4. The combination, with an elongated frame-bar, a clamping leaf-spring thereon to hold a fishing-reel aligned with a drying-reel, and a securing device to attach the frame-bar to a stable object, of a reel-supporting shaft laterally projected from the frame-bar, a spiral spring thereon, and a folding line-drying reel mounted on the reel-shaft in alignment with a clamped fishing-reel, substantially as shown and described.

5. The combination, with a frame provided with means for holding a fishing-reel and with a threaded boss, of a threaded shaft, a skeleton drying-reel carried by the shaft, an extension-bar provided at one end with a perforated boss and at the other end with a boss having a threaded perforation and a thumb-screw, substantially as shown and described.

FLETCHER M. ABBOTT.

Witnesses:
J. H. ROBINSON,
N. W. BINGHAM.